United States Patent
Lagarde et al.

(10) Patent No.: US 9,574,600 B2
(45) Date of Patent: Feb. 21, 2017

(54) ASSEMBLY FOR A TURBINE ENGINE

(71) Applicant: SNECMA, Paris (FR)

(72) Inventors: Romain Lagarde, Moissy Cramayel (FR); Francois Jean Comin, Moissy Cramayel (FR); Julien Meyer, Moissy Cramayel (FR)

(73) Assignee: SNECMA, Paris (FR)

( * ) Notice: Subject to any disclaimer, the term of this patent is extended or adjusted under 35 U.S.C. 154(b) by 292 days.

(21) Appl. No.: 14/301,472

(22) Filed: Jun. 11, 2014

(65) Prior Publication Data
US 2014/0369784 A1 Dec. 18, 2014

(30) Foreign Application Priority Data
Jun. 12, 2013 (FR) .................................... 13 55451

(51) Int. Cl.
*F16B 39/06* (2006.01)
*F16B 39/22* (2006.01)
(Continued)

(52) U.S. Cl.
CPC .............. *F16B 39/22* (2013.01); *F01D 25/16* (2013.01); *F16B 39/10* (2013.01); *F16B 39/282* (2013.01); *F16C 35/073* (2013.01); *F16D 1/06* (2013.01); *F05D 2230/70* (2013.01); *F05D 2260/30* (2013.01); *F05D 2260/36* (2013.01); *F05D 2260/38* (2013.01); *F16C 2360/23* (2013.01); *F16D 2001/103* (2013.01)

(58) Field of Classification Search
CPC ... F16B 39/22; F16D 2001/103; F05D 223/70

USPC .......................................... 411/204, 216, 221
See application file for complete search history.

(56) References Cited

U.S. PATENT DOCUMENTS 1,440,938 A * 1/1923 Sieroslawski ........... F16B 39/10
411/221
3,208,493 A * 9/1965 Holmes ................... F16B 39/32
411/193
(Continued)

FOREIGN PATENT DOCUMENTS

FR 2 783 579 A1 3/2000
FR 2 963 062 A1 1/2012
(Continued)

OTHER PUBLICATIONS

French Preliminary Search Report issued Apr. 14, 2014 in French Application 13 55451, filed on Jun. 12, 2013 ( with English Translation of Categories of Cited Documents).

*Primary Examiner* — Gary Estremsky
(74) *Attorney, Agent, or Firm* — Oblon, McClelland, Maier & Neustadt, L.L.P.

(57) ABSTRACT

The invention relates to an assembly for a turbine engine, the assembly comprising a tubular shaft (60), a nut (64) screwed onto an end portion of said tubular shaft (60), and a locking member (86) for locking the nut (64) on the shaft (60), said member (86) including means (90, 78) for coupling in rotation with the nut (64) and means (92, 68) for coupling in rotation with the shaft (60), said member (86) being movable between a position for coupling the nut (64) in rotation relative to the shaft (60), and a position for releasing the nut (64) relative to the shaft (60). The nut (64) includes a housing (72) in which said member (86) is suitable for being held when in its release position.

9 Claims, 5 Drawing Sheets

(51) Int. Cl.
    *F01D 25/16*     (2006.01)
    *F16C 35/073*     (2006.01)
    *F16D 1/06*     (2006.01)
    *F16B 39/10*     (2006.01)
    *F16B 39/282*     (2006.01)
    *F16D 1/10*     (2006.01)

(56) References Cited

U.S. PATENT DOCUMENTS

| | | | |
|---|---|---|---|
| 3,402,750 A | | 9/1968 | Readman et al. |
| 5,221,168 A | * | 6/1993 | Kasai .................... F16C 35/063 411/124 |
| 8,092,132 B2 | * | 1/2012 | Zink .................... F16B 39/103 411/198 |
| 8,122,797 B2 | * | 2/2012 | Bruurs .................... B23D 17/00 30/223 |

FOREIGN PATENT DOCUMENTS

| | | |
|---|---|---|
| FR | 2 981 694 A1 | 4/2013 |
| GB | 802 263 | 10/1958 |

\* cited by examiner

ASSEMBLY FOR A TURBINE ENGINE

BACKGROUND OF THE INVENTION

Field of the Invention

The present invention relates to an assembly for a turbine engine, the assembly comprising a nut screwed onto an end portion of a tubular shaft and a locking member for locking the nut on the shaft. The invention also relates to a turbine engine including such an assembly.

Description of the Related Art

A turbine engine conventionally comprises a high pressure compressor arranged therein between an upstream low pressure compressor and a combustion chamber. The compressor has a plurality of rows of movable blades carried by a tubular shaft of the high pressure compressor, which shaft includes a cylindrical bearing surface carrying a bearing for guiding the shaft in rotation. A blocking member is inserted inside the shaft and includes a radial shoulder that bears upstream against a corresponding shoulder in the shaft. The upstream end of the blocking member includes a threaded portion projecting axially upstream from the upstream end of the shaft and having a ring screwed thereon for supporting sealing wipers. Said member is prevented from moving both in rotation and also axially downstream by a stop or locking ring that is inserted from downstream inside the shaft.

The ring has a cylindrical wall carrying external fluting that is axially engaged in corresponding fluting on the inside surface of the shaft, and fingers extending upstream that are engaged in notches in the downstream end of the blocking member. Elastically deformable fingers extend downstream from the downstream end of the cylindrical wall, and each has a rim at its downstream end that projects radially outwards for engaging in notches in the shaft.

With such an assembly, the blocking member is thus blocked against moving in rotation or axially relative to the shaft. Disassembly is performed by applying a radially inwardly directed bending force to the downstream ends of the tongues so as to disengage the rims of the tongues from the notches in the shaft, thus enabling the locking ring to be completely withdrawn. This allows the blocking member to be moved in translation downstream and enables it to be removed after unscrewing the wiper support.

During such disassembly, there is a risk of the locking ring being lost.

BRIEF SUMMARY OF THE INVENTION

A particular object of the invention is to provide a solution to this problem that is simple, effective, and inexpensive.

To this end, the invention provides an assembly for a turbine engine, the assembly comprising a tubular shaft, a nut screwed onto an end portion of said tubular shaft, and a locking member for locking the nut on the shaft, said member including means for coupling in rotation with the nut and means for coupling in rotation with the shaft, said member being movable between a position for coupling the nut in rotation relative to the shaft, and a position for releasing the nut relative to the shaft, the assembly being characterized in that the nut includes a housing in which said member is suitable for being held when in its release position.

In this way, when it is desired to unscrew the nut from the shaft, the unlocking member needs to be moved into the above-mentioned housing in which it is held in its release position. There is thus no longer any risk of the locking member being lost during unscrewing of the nut.

According to a characteristic of the invention, the locking member includes an elastically deformable portion extending circumferentially, said housing of the nut being formed by at least a first groove suitable for receiving the circumferential portion of the locking member when it is in its release position.

Under such circumstances, the nut may include a second groove that is axially offset from the first groove and that is suitable for receiving the circumferential portion of the locking member when it is in its rotary coupling position.

The grooves thus define stable positions for the locking member that are easily identifiable by an operator, both by touch and by sight. This makes it possible to avoid any risk of the locking member being wrongly positioned by an operator.

The grooves also enable the locking member to be turned inside said grooves. This facilitates angular positioning of the locking member relative to the shaft and/or relative to the nut.

Preferably, the means for coupling said member in rotation with the shaft and/or the means for coupling said member in rotation with the nut comprise fingers suitable for co-operating with recessed zones of the shaft and/or of the nut.

Under such circumstances, the corresponding end of the shaft may include teeth arranged over the entire periphery of the shaft, at least a first tooth of the coupling member being suitable for engaging in the recessed zones defined between said teeth of the shaft in the rotary coupling position of the locking member.

Furthermore, the nut may include an annular zone having teeth arranged over the entire periphery of said annular zone, at least one second finger of the locking member being suitable for engaging in the recessed zones defined between said teeth of the nut in the rotary coupling position of the locking member.

Advantageously, the annular zone of the nut having the teeth is situated axially between the first and second grooves of the nut.

In addition, the circumferential portion of the locking member may be formed by an elastically deformable ring portion with free ends including balance weights of the locking member.

The invention also provides a turbine engine, such as an airplane turboprop or turbojet, that includes an assembly of the above-specified type.

BRIEF DESCRIPTION OF THE SEVERAL VIEWS OF THE DRAWINGS

The invention can be better understood and other details, characteristics, and advantages of the invention appear on reading the following description made by way of non-limiting example and with reference to the accompanying drawings, in which.

DETAILED DESCRIPTION OF THE INVENTION

Figure 1:
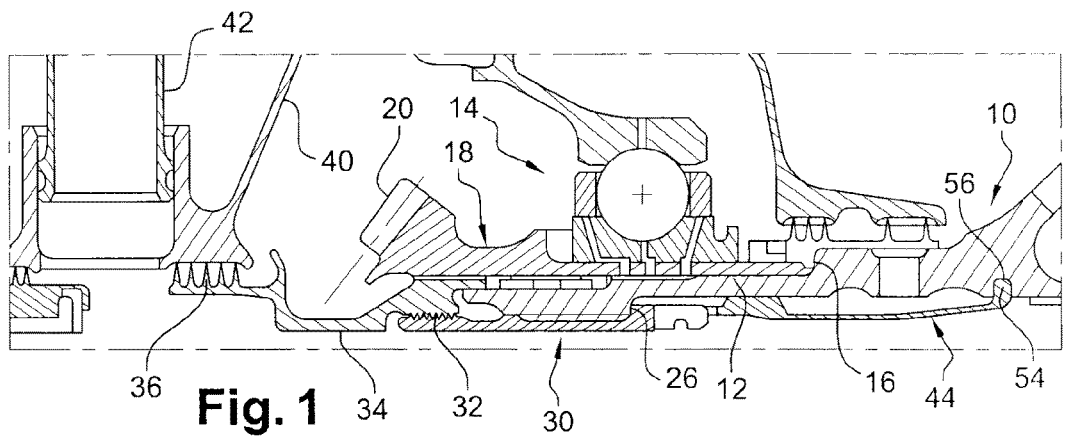
FIG. 1 is a diagrammatic axial section view of an inner and upstream portion of a shaft of a high pressure compressor of the prior art.

Reference is made initially to FIG. 1, which shows a tubular shaft 10 of a high pressure compressor of the prior art carrying externally a plurality of annular rows of moving blades (not shown). The upstream end of the shaft has a cylindrical bearing surface 12 having a ball bearing 14 arranged thereabout that is prevented from moving indirectly at its downstream end against a radial shoulder 16 on the shaft 10 and at its upstream end by a support 18 for a bevel gear 20 for meshing with a corresponding bevel gear of a radial shaft (not shown) for driving accessory equipment in a manner well known to the person skilled in the art.

Figure 2:
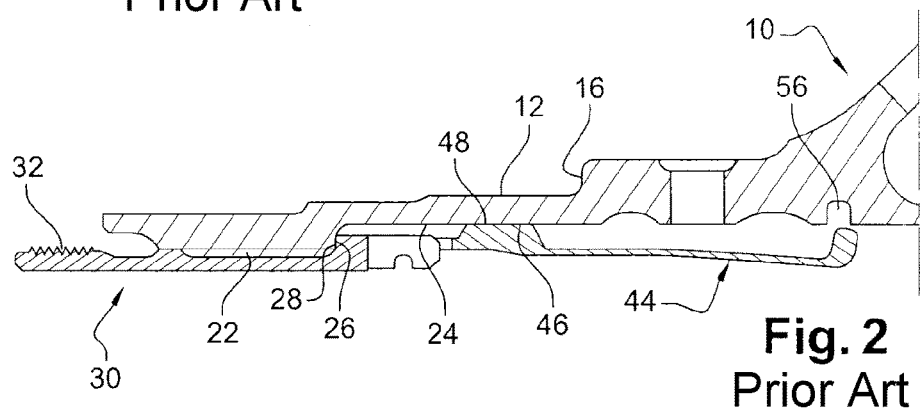
FIG. 2 is a diagrammatic axial section view showing in isolation the upstream end of the shaft together with a nut and a stop ring of the prior art.

As can be seen more clearly in FIG. 2, the inside surface of the cylindrical bearing surface 12 of the shaft has an upstream first surface 22 and a downstream second surface 24 that are substantially cylindrical and that are connected together by a radial annular surface 26 forming a radial shoulder having pressed thereagainst a downstream radial annular rim 28 of a blocking member 30 engaged from downstream inside the shaft 10. The upstream end of the blocking member 30 has an externally threaded portion 32 projecting axially upstream from the upstream end of the shaft 10. A support 34 for sealing wipers 36 carrying the support 18 for the bevel gear 20 and preventing it from moving upstream is screwed onto the threaded portion 32 of the blocking member 30 and co-operates at its end upstream from the wiper means 36 with the inside face of an annular sealing plate 40 carrying feed tubes 42 for delivering air under pressure in a manner well known to the person skilled in the art. The support 34 is arranged axially facing the upstream end of the shaft 10 of the high pressure compressor and thus blocks the blocking member 30 against being removed axially downstream.

Figure 3:
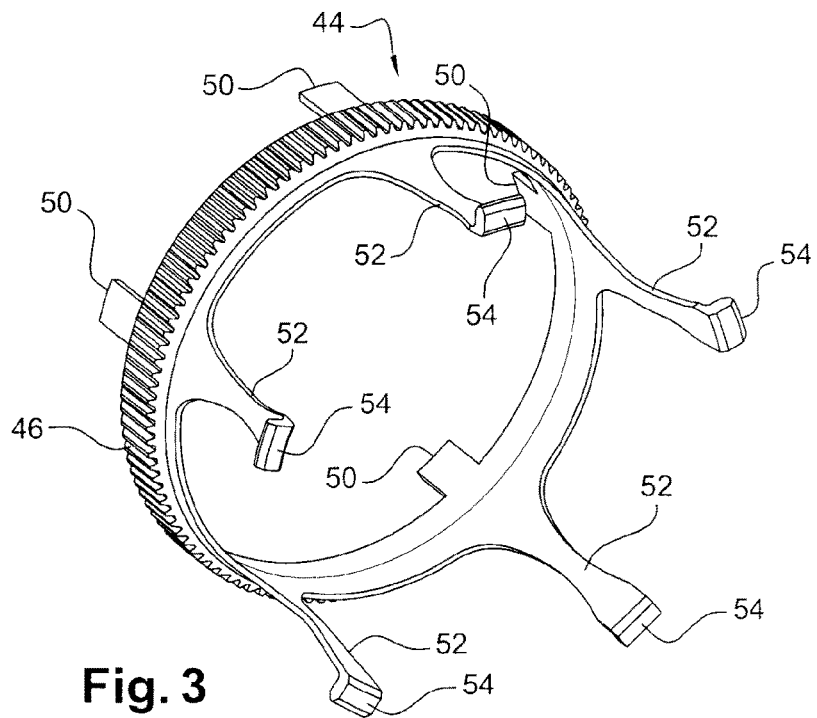
FIG. 3 is a diagrammatic perspective view of the stop ring of FIGS. 1 and 2.

A locking or stop ring 44 for coupling the blocking member 30 and the shaft 10 in rotation is mounted from downstream inside the cylindrical bearing surface 12 downstream from the shoulder 26 of the shaft 10 and it includes axial fluting 46 co-operating with axial fluting 48 of the second surface of the cylindrical bearing surface 12. The upstream end of the ring 44 has five axial fingers 50 (FIG. 3) engaged in notches in the downstream end of the nut for preventing the member 30 from turning relative to the shaft 10. The downstream end of the ring 44 has five elastically deformable tongues 52 each in axial alignment with an axial finger 50 and each including at its downstream end a rim 54 that extends radially outwards and that is engaged in a notch 56 in the cylindrical bearing surface 12 of the shaft of the high pressure compressor to block the ring 44 axially inside the shaft 10.

With such an assembly, the member 30 is thus prevented from turning inside the shaft 10 by a ring 44 that is prevented from moving both in rotation and also axially relative to the shaft 10.

As shown in FIG. 2, the ring 44 is removed by applying respective radially inwardly directed bending forces to the downstream ends of the tongues 52 so as to disengage them from the notches 56 in the cylindrical bearing surface 12 of the shaft 10. The ring is then completely disengaged from the nut and from the shaft, and there is a risk of an operator accidentally losing this ring.

FIGS. 4 to 9 show an assembly of the invention enabling this drawback to be remedied.

This assembly comprises a hollow shaft 60 for a high pressure compressor having a threaded upstream portion 62 on which a nut 64 is engaged. The annular upstream end of the shaft 60 has teeth 66 extending axially that are regularly distributed around the entire circumference of the end. Between them, the teeth 66 define recessed zones 68 that perform a function that is described in detail below.

The nut 64 has a downstream portion with a radially inside surface that includes tapping 70 so as to be capable of co-operating with the thread 62 of the shaft 60. The nut 64 also includes an upstream portion with a radially inside surface having formed therein a first groove referred to as an "upstream" groove 72, and a second groove referred to as a "downstream" groove 74, the grooves being axially offset from each other. The two grooves 72 and 74 are spaced apart from each other axially by an annular portion presenting teeth 76 extending radially inwards from the inside surface of the nut 64. The teeth 76 are regularly distributed around the entire circumference of said annular portion, and between them they define recessed zones 78 for performing a function that is described below.

Figure 5:
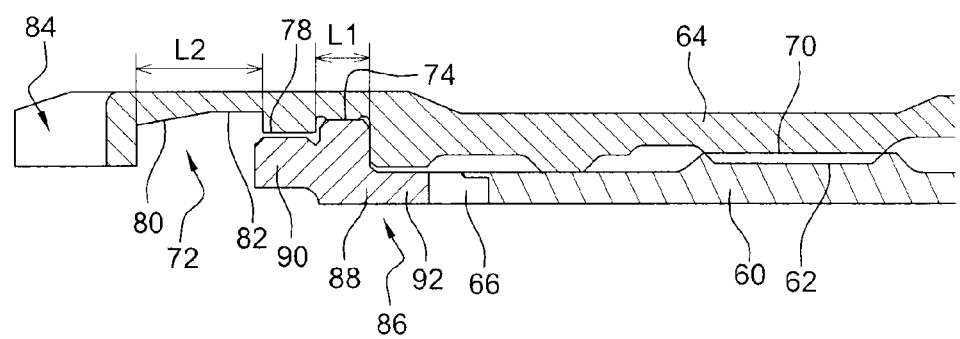
FIG. 5 is a diagrammatic axial section view of a portion of the FIG. 4 assembly, the locking member being in its position for coupling the nut and the shaft together in rotation.

As can be seen more clearly in FIG. 5, the downstream groove 74 has a section that is square or rectangular with a width (i.e. an axial dimension) L1. In addition, the upstream groove 72 has a width L2 and includes a bottom wall presenting an upstream portion 80 that is frustoconical and a downstream portion 82 that is cylindrical.

The upstream annular end of the nut 64 presents notches 84 that open out upstream for engaging a tool for tightening or loosening the nut.

In order to hold the nut 64 in position on the shaft 60, a locking member 86 is mounted at the upstream end of the shaft 60 and radially inside the nut 64. This locking member 86 has an elastically deformable portion 88 forming a ring portion, with a circumferentially middle zone including a finger 90 that extends axially upstream and a finger 92 that extends axially downstream. The two fingers 90 and 92 preferably extend in line with each other.

The free ends of the elastically deformable portion 88 include enlarged zones 94 forming portions of cylinders that are to constitute balancing weights so as to avoid any unbalance in operation, i.e. when the assembly is rotating. Each enlarged zone 94 includes a hole 96 for engaging a peg of a tool that is to deform the locking member 86.

Figure 4:
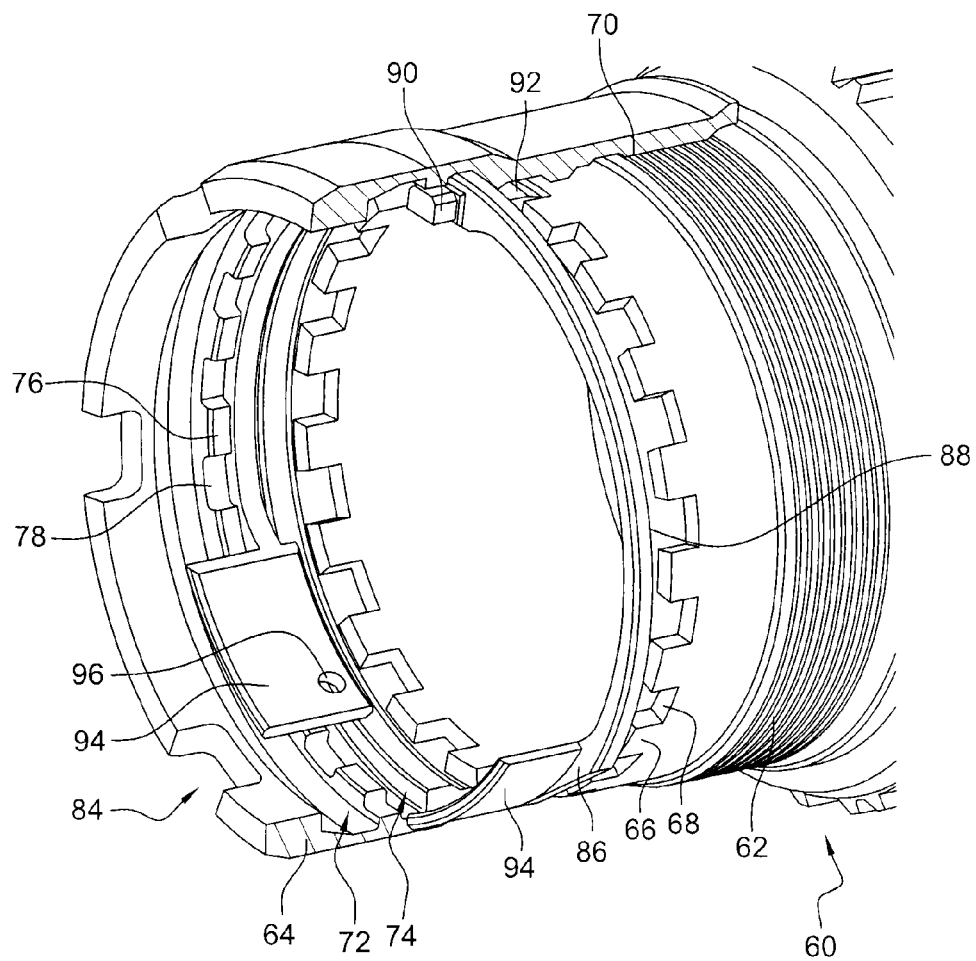
FIG. 4 is a perspective view of a portion of an assembly of the invention, the locking member being in its position for coupling the nut and the shaft together in rotation.
Figure 6:
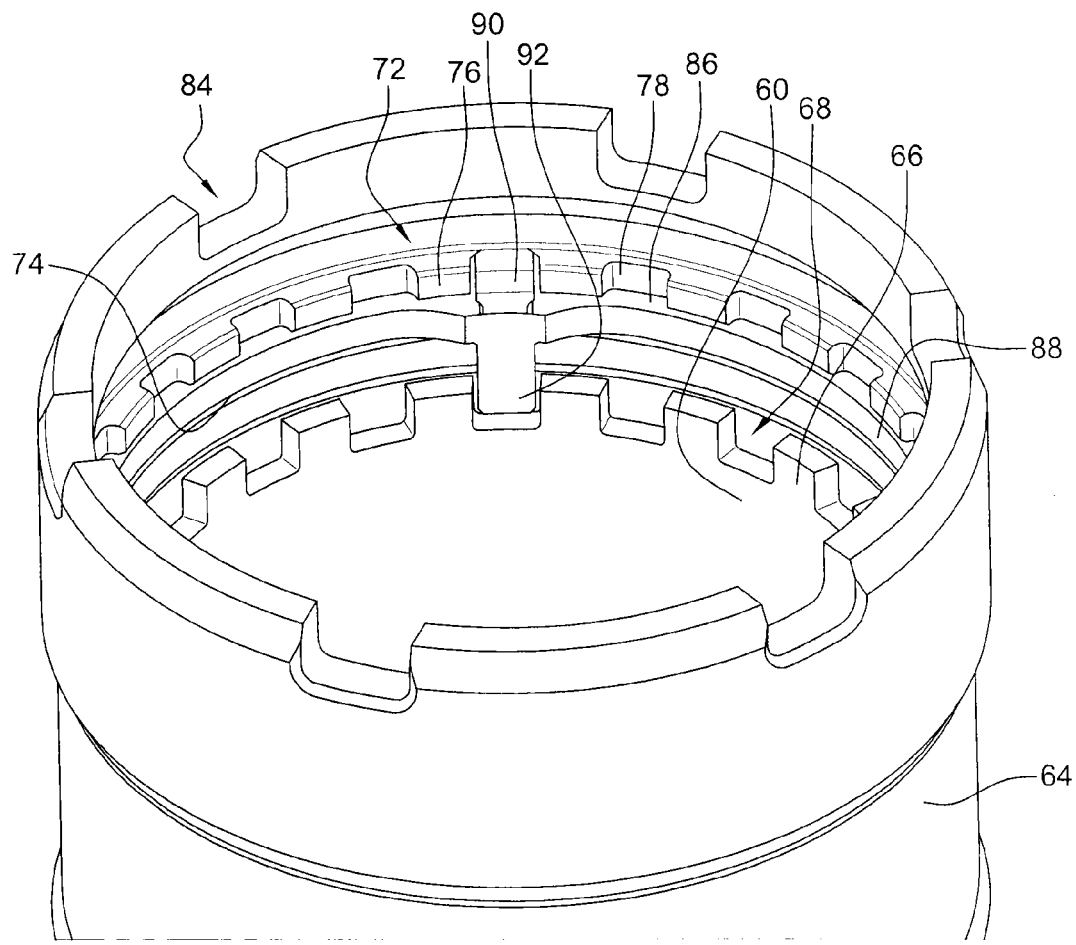
FIG. 6 is a perspective view of a portion of the assembly of FIGS. 4 and 5, the locking member being in its position for coupling the nut and the shaft together in rotation.

FIGS. 4 to 6 show a position of the locking member 86 in which it couples the nut 64 and the shaft 60 together in rotation. In this position, the deformable portion 88 forming a portion of a ring is engaged in the downstream groove 74, the finger 92 is engaged in a recessed zone 68 of the shaft 60, and the finger 90 is engaged in a recessed zone 78 of the nut 64. The width of the deformable portion 88 is substantially equal to the width L1 of the downstream groove 74, with operating clearance nevertheless being provided.

The enlarged portions 94 in the form of portions of a cylinder cover a portion of the grooves 72, 74 and of the teeth 76 of the nut 64.

Figure 7:
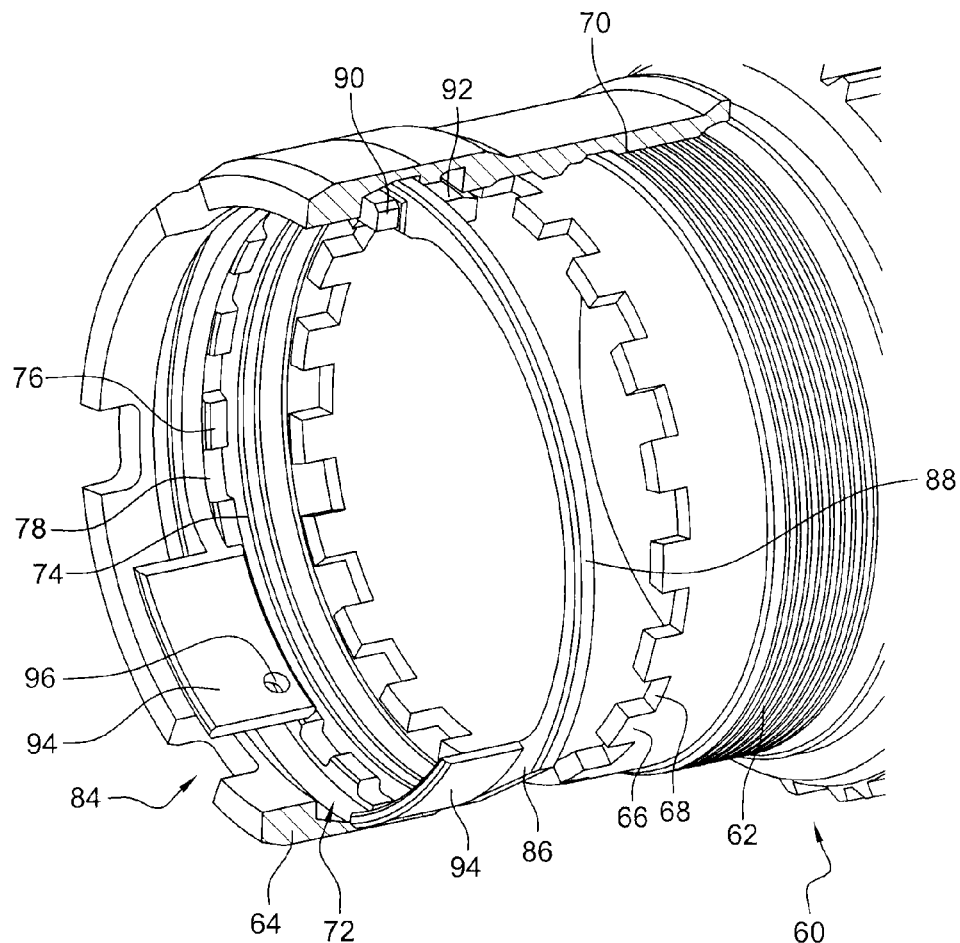
FIGS. 7 to 9 are views corresponding respectively to FIGS. 4 to 6, in which the locking member is in its position for releasing the nut relative to the shaft.
Figure 8:
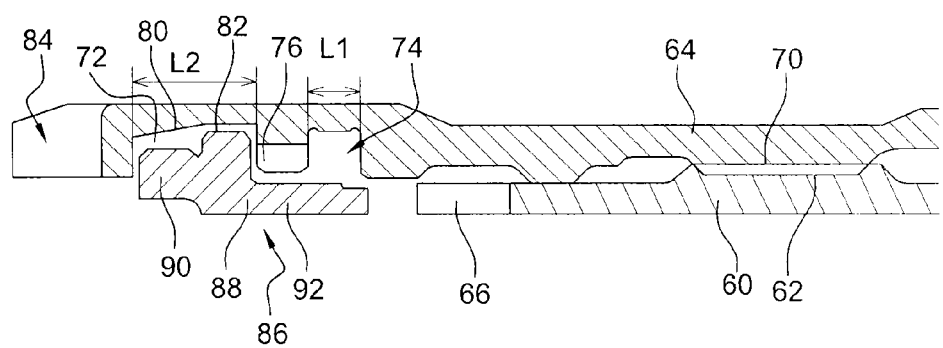
Figure 9:
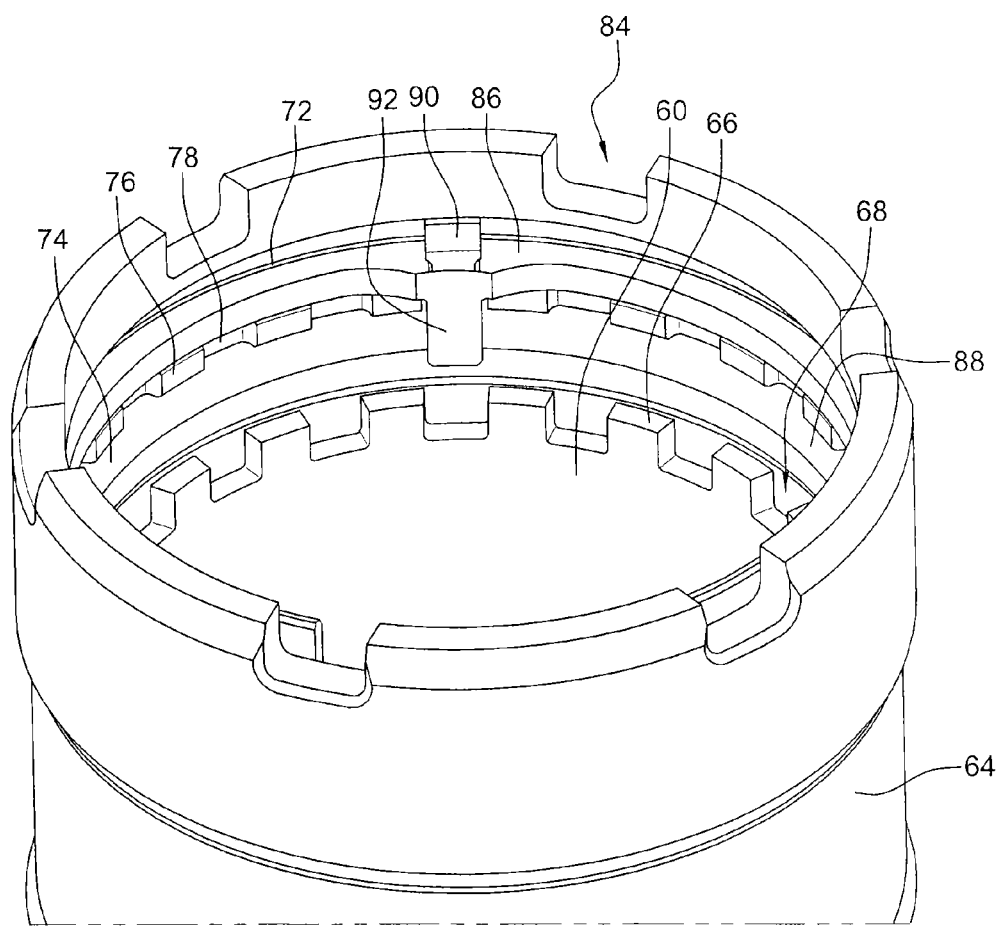

When it is desired to withdraw the nut 64 from the shaft 60, it is necessary to move the locking member 86 from its above-described position for providing rotary coupling. For this purpose, an operator deforms the locking member 86 by moving the free ends of the deformable portion 88 closer together by means of a tool that is engaged in the holes 96. The diameter of the locking member 86 is thus reduced, like a spring clip. This enables the locking member 86 to be moved axially through the annular zone carrying the teeth 76, after which the deformable portion 88 can be released so that the locking member 86 is in its position for releasing the nut 64, as shown in FIGS. 7 to 9.

In this position, the deformable portion 88 forming a portion of the ring and the finger 90 are received at least in part in the upstream groove 72, the finger 92 extending radially inside the teeth 76. In a variant that is not shown, the finger 92 may engage, at least in part, in the recessed zones 78 defined between the teeth 76 of the nut 64, in the release position of the locking member 86.

The combined widths of the finger 90 and of the deformable portion 88 are less than the width L2 of the upstream groove 72. The frustoconical portion 80 facilitates proper axial positioning of the locking member 86 when it is in its release position.

In this release position, the locking member 86 is no longer constrained to rotate with the shaft 60, so the nut 64 can be unscrewed and removed. During this removal stage, the locking member 86 remains trapped inside the upstream groove 72 of the nut 64, thereby avoiding any accidental loss of said member 86.

When it is desired once more to screw the nut 64 onto the shaft 60 and prevent it from moving, it suffices to make sure that after tightening, at least two recessed zones 68 and 78 of the shaft 60 and of the nut 64 are arranged facing each other. The dimensions and the numbers of the recessed zones 68 and 78 are such that for each angular range of small determined size (e.g. one degree) of the nut 64 relative to the shaft 60, it is possible to find two recessed zones 68, 78 of the shaft 60 and of the nut 64 that face each other. The locking member 86 can then be deformed, positioned angularly so as to put the fingers 90 and 92 into alignment with the appropriate recessed zones 68 and 78, and then moved into its rotation coupling position. Once the locking member 86 has been released, it is thus held securely in this position and once more couples the nut 64 and the shaft 60 together in rotation.

It should be observed that throughout these steps of installing or removing the nut 64, any risk of losing the locking member 86 is under control.

The invention claimed is:

1. An assembly for a turbine engine, the assembly comprising:
   a tubular shaft;
   a nut screwed onto an end portion of said tubular shaft; and
   a locking member for locking the nut on the shaft, said locking member including means for coupling in rotation with the nut and means for coupling in rotation with the shaft, said locking member being movable between a rotary coupling position for coupling the nut in rotation relative to the shaft, and a release position for releasing the nut relative to the shaft,
   wherein the nut includes a housing in which said locking member is held when said locking member is in the release position, the housing being formed by a first groove provided in an inner radial surface of the nut, and
   wherein the locking member engages a free end of the shaft in the rotary coupling position.

2. An assembly according to claim 1, wherein the locking member includes an elastically deformable portion extending circumferentially, and said first groove receives the elastically deformable circumferential portion of the locking member in the release position.

3. An assembly according to claim 2, wherein the nut includes a second groove that is axially offset from the first groove and that receives the elastically deformable circumferential portion of the locking member in the rotary coupling position.

4. An assembly according to claim 3, wherein at least one of the means for coupling said member in rotation with the shaft and the means for coupling said member in rotation with the nut comprise fingers which cooperate with recessed zones of at least one of the shaft and the nut.

5. An assembly according to claim 4, wherein the free end of the shaft includes teeth arranged over an entire periphery of the shaft, a finger of the locking member engaging in the recessed zones defined between said teeth of the shaft in the rotary coupling position of the locking member.

6. An assembly according to claim 4, wherein the nut includes an annular zone having teeth arranged over an entire periphery of said annular zone, a finger of the locking member engaging in the recessed zones defined between said teeth of the nut in the rotary coupling position of the locking member.

7. An assembly according to claim 6, wherein the annular zone of the nut having the teeth is situated axially between the first and second grooves of the nut.

8. An assembly according to claim 2, wherein the elastically deformable circumferential portion of the locking member is formed by an elastically deformable ring portion with free ends including balancing weights of the locking member.

9. A turbine engine comprising an assembly according to claim 1.

* * * * *